United States Patent [19]

Chisvin et al.

[11] Patent Number: 5,276,809
[45] Date of Patent: Jan. 4, 1994

[54] METHOD AND APPARATUS FOR CAPTURING REAL-TIME DATA BUS CYCLES IN A DATA PROCESSING SYSTEM

[75] Inventors: Lawrence A. P. Chisvin, Sudbury; John K. Grooms, Webster; Richard L. Sites, Boylston; Donald W. Smelser, Bolton, all of Mass.

[73] Assignee: Digital Equipment Corporation, Maynard, Mass.

[21] Appl. No.: 543,483

[22] Filed: Jun. 26, 1990

[51] Int. Cl.$^5$ .............................. G06F 13/12
[52] U.S. Cl. ........................ 395/250; 395/275; 364/DIG. 1; 364/238.6; 364/247; 324/76.39
[58] Field of Search ............... 395/325, 275, 925, 800, 395/725, 250; 371/19, 16, 22.1-; 324/76.92, 76.47, 76.82, 76.39, 76.41, 76.48, 76.55, 76.58, 76.62

[56] References Cited

U.S. PATENT DOCUMENTS

| | | | |
|---|---|---|---|
| 3,344,406 | 9/1967 | Vinal | 395/425 |
| 4,137,562 | 1/1979 | Boeck et al. | 364/200 |
| 4,639,860 | 1/1987 | Peters | 395/325 |
| 4,972,365 | 11/1990 | Dodds et al. | 364/900 |
| 5,077,656 | 12/1991 | Waldron et al. | 395/325 |
| 5,121,480 | 6/1992 | Bonke et al. | 395/250 |
| 5,127,103 | 6/1992 | Hill et al. | 395/575 |
| 5,131,081 | 7/1992 | MacKenna et al. | 395/275 |
| 5,131,085 | 7/1992 | Eikill et al. | 395/325 |

Primary Examiner—Jerry Smith
Assistant Examiner—Mehmet Geckil
Attorney, Agent, or Firm—Arnold, White & Durkee

[57] ABSTRACT

A method and apparatus for implementing a capture of a long contiguous chain of data bus cycles for the memory system of a data processing system with memory units that alternate between real time capture of segments of the chain of data bus cycles and processing of the data bus signals in the captured segments.

9 Claims, 2 Drawing Sheets

METHOD AND APPARATUS FOR CAPTURING REAL-TIME DATA BUS CYCLES IN A DATA PROCESSING SYSTEM

FIELD OF THE INVENTION

The present invention relates to memory subsystem management, and more particularly to methods and apparatus for capturing real-time bus signals for later inspection and analysis.

BACKGROUND OF THE INVENTION

Computer systems commonly employ a bus to provide a data path connecting the elements of the system. Computer system elements, such as processors, memory modules and mass storage devices, are typically all coupled to the bus, so that bus signals are available to all such elements. In a common implementation, each element is assigned a particular address so that only bus communications addressing a particular element are received by that element. Buses of the type thus described are oftentimes parallel in nature, such as when many bits comprising a data word are carried over the bus simultaneously via a plurality of lines. Such busses are typically governed by a single clock so that all bus cycles are synchronous with that clock.

In the development, configuration and servicing of computer systems having a bus as set forth above, it is often necessary to study and analyze a sequence of bus cycles for such purposes as debugging, fine tuning system parameters and trouble-shooting. To capture a sequence of bus cycles, it has heretofore been necessary to utilize a test apparatus such as a logic analyzer or some other hardware attachable to the bus and dedicated to performing testing and monitoring functions. While such test equipment is capable of capturing a sequence of real-time bus cycles, it typically suffers from shortcomings in terms of performance in that the number of sequential cycles that is capturable is relatively small.

For instance, a high speed logic analyzer may be capable of capturing on the order of 65,000 consecutive bus cycles. Though such a number of captured cycles may suffice for purposes of analysis, with a bus cycle frequency of 16 MHz, as commonly used, it amounts to only four milliseconds of captured real-time bus cycle activity usable for analysis. With a relatively small capacity for captured cycles, it is crucial, with such test equipment, that the triggering conditions be precisely set. If the triggering conditions are not carefully evaluated and selected, it is highly likely that the bus event of interest will be outside the relatively narrow window of captured cycles. Furthermore, certain complex, intermittent system problems may be simply unsolvable with a device having a low capacity for captured cycles, because analyzing an extensive history of bus cycle information may be the only way to solve such problems.

Using dedicated test equipment to capture bus cycles has other drawbacks in terms of convenience and cost. Logic analyzers and other similar test apparatus are complex and costly pieces of hardware. Clearly, the aforementioned performance shortcomings are solvable by creating a logic analyzer with enormous memory capability. That, however, would make an already costly apparatus prohibitively expensive. Dedicated equipment for capturing bus cycles is often inconvenient to use as well, especially when performing service on computer systems in the field, where the test equipment must be physically brought to and connected to the bus. Furthermore, incorporating such a dedicated device in a computer system, aside from the cost, causes significant problems such as providing physical space for it and providing power for it.

SUMMARY OF THE INVENTION

The present invention overcomes the foregoing and other shortcomings and drawbacks of bus signal capturing techniques heretofore used by providing a method and apparatus for incorporating in a computer system main memory module the capability of capturing sequential bus cycle signals. The function of capturing sequential bus cycles in a main memory module thereby has minimal cost in terms of added hardware needed to implement the function. Furthermore, a typical main memory has a large capacity, which allows the capture of approximately 128 million consecutive bus cycles, or eight seconds of real-time bus activity.

According to the present invention, a computer system, operating under system software control, configures a memory to capture and store a sequence of data bus cycles. The memory may comprise one or more memory modules, depending on system parameters. If the memory has a writing speed that is equivalent to the data rate of the data bus, then a single memory module is sufficient to capture and store sequences of data bus cycles.

When the memory has a writing speed that is slower than the data rate of the data bus, two or more memory modules are used in a configuration that permits the memory modules to consecutively capture sequences of data cycles and write the captured data cycles in alternation so that a continuous string of data cycles can be written into the memory without interruption.

In the preferred embodiment of the invention, two memory modules are used, so that they may have a writing speed that is less than the data rate of the data bus. These memory modules may comprise two of the main memory modules that are temporarily taken out of service for this purpose, or two additional memory modules that have been added to the system. One of the memory modules is configured as an "even" module, and the other is configured as an "odd" module. The computer system, under system software control, then arms the memory modules to trigger on a predetermined hardware or software triggering event.

When the triggering event occurs, the even module immediately begins capturing bus cycles and captures, in a temporary queue, the first eight bus cycles following the triggering event. After the even module's queue is full with the first eight bus cycles, the odd module begins to capture, in a similar temporary queue, a second group of eight bus cycles. While the odd module is capturing the next eight cycles, the even module is copying its queue's contents, the first eight cycles, into the main memory storage elements of the even module. The copying operation for the even module is completed before the odd module is finished capturing the second group of eight cycles so that, after the second group is captured, the even module's queue is then available to capture a third group of eight bus cycles.

The even and odd modules cooperate and continue to capture consecutive bus cycles, in an alternating fashion, with one capturing eight real-time bus cycles in a queue while the other is copying its queue's contents into its main memory. The capturing continues until the even and odd modules are full or until a second predetermined hardware or software triggering event occurs. At this point, the computer system, under system software control, intervenes to halt the capturing process. The even and odd main memory modules can then be emptied of their stored data, and the data which represents consecutive bus cycle information, is analyzed in any appropriate manner.

In a similar manner, the memory can comprise three or more memory modules to allow the writing speeds of the memory modules to be proportionally less than the data rate of the data bus. For instance, four of the memory modules can be used instead of two to allow the capture of data bus cycles from a data bus having a data rate that is twice as fast.

DETAILED DESCRIPTION OF THE PREFERRED EMBODIMENT

Figure 1:
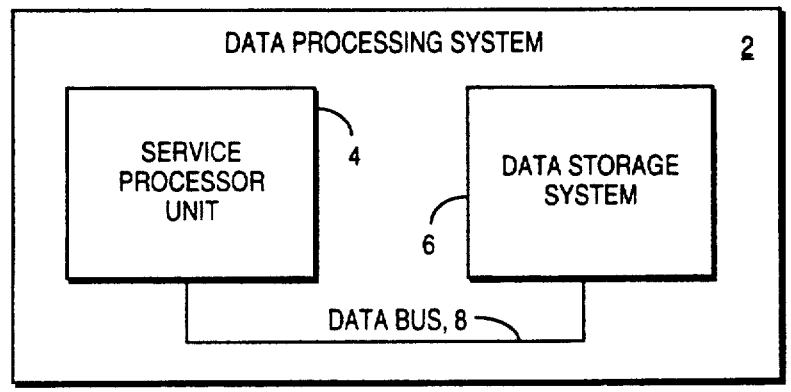
FIG. 1 is a data processing system suitable for incorporating the present invention.

Referring to the drawings, wherein like characters designate like or corresponding parts throughout the views, FIG. 1 shows a data storage system 2 suitable for incorporating the present invention. The data processing system 2 comprises a service processor unit (SPU) 4, a data storage system 6, and a data bus 8 linking the service processor unit 4 to the data storage system 6. Typically, the data bus 8 has a quadword (64 bit) configuration, although the present invention is adaptable to other data bus configurations, as will be appreciated by those skilled in the art.

In the preferred embodiment of the invention described below, the data storage system 6 comprises a first memory unit 10 and a second memory unit 12 both coupled to the data bus 8 so that contiguous bus cycles on the bus 8 can be captured without interruption. This allows the memory unit 10 and the memory unit 12 to have a writing speed that is only a fraction of the data rate for the data bus 8. Regardless of the number of memory units that comprise the data storage system 6, this continuous capture of data bus cycles is termed the "SILO" mode of operation of the present invention.

The first memory unit 10 and the second memory unit 12 are configured, via control and status register (CSR) programming, so that one of the two memory units 10 and 12 captures the bus cycles that the other one misses. Initialization of the SILO mode is established by writing suitable data in the CSR locations that program the memory units 10 and 12 for the SILO mode.

The memory units 10 and 12 are synchronized by the data bus 8. One of the memory units 10 and 12, for instance, the memory unit 10 is configured as an "even" memory unit, and the other one, the memory unit 12, is configured as an "odd" memory unit. The even memory unit 10 serves as a master memory and the odd memory unit 12 serves as a slave memory. The master/slave configuration insures that the memory units 10 and 12 cycle in a complementary fashion with respect to each other.

Figure 2:
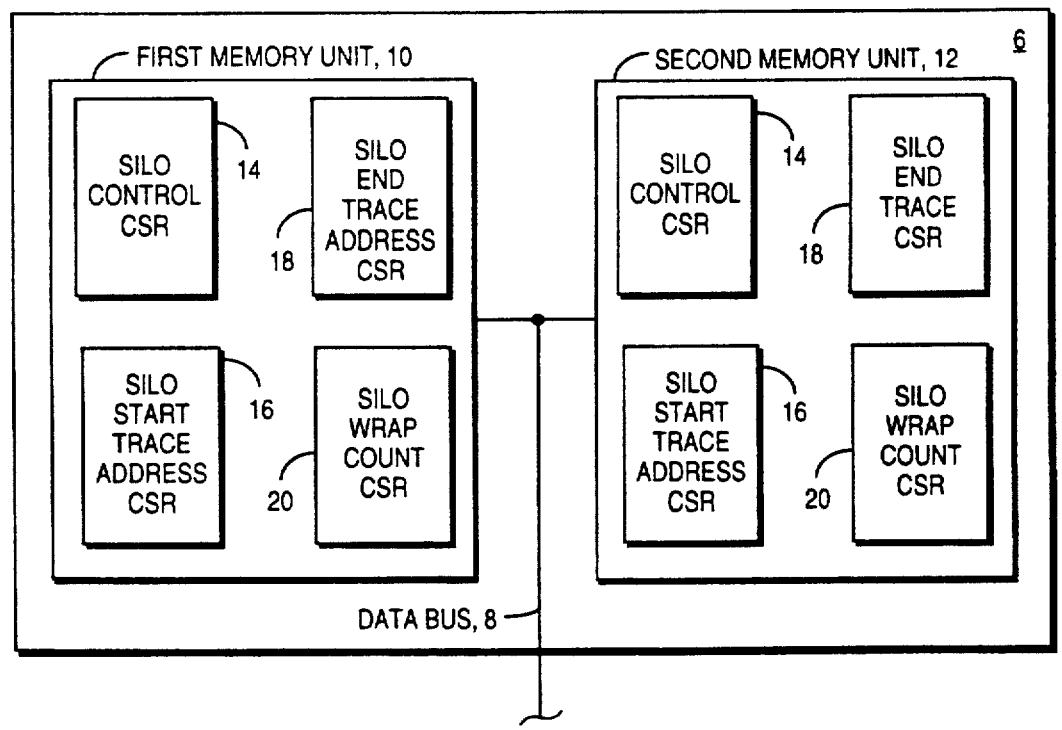
FIG. 2 is a data storage system for the data processing system shown in FIG. 1.

Each of the memory units 10, 12 are configured to respond to SILO commands with appropriate control and status register (CSR) programming. The SILO commands are I/O writes. As shown in FIG. 2, the configuration of each of the memory units 10, 12 includes a SILO control (SICTL) CSR 14, a SILO start trace address (SISTA) CSR 16, a SILO end trace address (SIENA) CSR 18, and a SILO wrap 30 count (SIWRA) CSR 20, all with 32 bit fields.

To properly configure the memory units 10 and 12 in this way, the physical memory start address for the SILO mode must be programmed in the appropriate ones of the CSR's 14, 16, 18 and 20. Furthermore, all necessary event stop conditions must be programmed in the appropriate ones of the CSR's 14, 16, 18 and 20 as well. These events include the filling of the memory units 10 and 12 when the SILO mode is operated in the non-wrapping mode, error on the data bus 8 as indicated by the assertion of a bad bus command, and any normal system activities when an expected confirmation command is not received.

The appropriate ones of the CSR's 14, 16, 18 and 20 must also be programmed to correspond to the master/slave configuration of the memory units 10 and 12. In this case, the memory unit 10 is identified as the master memory and the memory unit 12 is identified as the slave memory.

Also, the appropriate ones of the CSR's 14, 16, 18 and 20 must be programmed to indicate the node number of the selected one of the memory units 10 and 12 that the memories 10 and 12 will both respond to. In this way, both of the memories 10 and 12 respond to identical input/output (I/O) addresses. Finally, the appropriate ones of the CSR's 14, 16, 18 and 20 are programmed to be responsive to a selected check bit for capturing fields.

Figure 3:
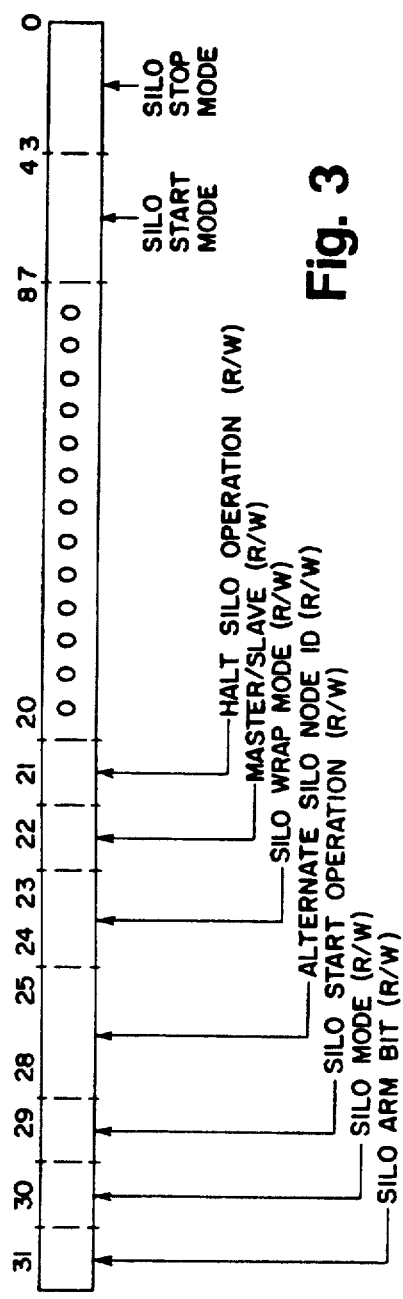
FIG. 3 is a data field for the input of a SILO control command control and status register according to the present invention.

To initiate the SILO operation, masked 32 bit, longword-aligned SILO control commands are sent to the address of the SICTL CSR 14. The commands are masked to be aligned with 64 bit commands that are transmitted on the data bus 8. The 32 bit field for the SICTL CSR 14 is shown in FIG. 3.

The SICTL CSR 14 has the number 0 through 3 bit positions of its 32 bit field reserved for identifying a SILO stop mode. The stop mode may be a mode that is responsive to any one of a variety of events.

For instance, the stop mode may stop the data bus cycle capture process in response to a command, a data bus error, a memory error or a complete wrap of the memory provided by the memory units 10 and 12 for the data bus cycle capture. The four bits so provided allow up to sixteen different stop modes to be selected, if so desired.

The SICTL CSR 14 has the number 4 through 7 bit positions of its field reserved for identifying a SILO start mode. The start mode may also be a mode that is responsive to any one of a variety of events, such as those described above in connection with the stop mode.

A must-be-zero (MBZ) field occupies the number 8 through 20 bit positions of the field for the SICTL CSR 14. This MBZ field is included to provide the longword alignment of the CSR field for the control commands to the SICTL CSR 14.

The SICTL CSR 14 has the number 21 bit position in its field reserved for a halt SILO operation when the stop mode identified in the number 0 through 3 bit positions of the SICTL CSR 14 is a mode responsive to a bit transmitted by a control command with a bit in the number 21 bit position of the CSR field. In this case, the stop mode is responsive to a software trigger represented by this bit that is transmitted by the command.

The SICTL CSR 14 has the number 22 bit position in its field reserved for master/slave identification by a corresponding control command. The presence or absence of a bit in this position determines if the one of the memories 10 and 12 corresponding to the SICTL CSR 14 addressed by the command is to be the master or the slave memory.

The SICTL CSR 14 has the number 23 and 24 bit positions in its field reserved for identification of a SILO wrap mode. The wrap mode may be a mode that allows the memory allocated to capture of the data bus cycles in the memory units 10 and 12 to wrap itself forever, or not wrap at all, for instance. The two bit positions so provided allow a selection of up to four different modes.

The SICTL CSR 14 has the number 25 through 28 bit positions in its field reserved for an alternate SILO node identification. This address indicates the common Input/Output address that the memories 10 and 12 should respond to during the SILO operation.

The SICTL CSR 14 has the number 29 bit position in its field reserved for a start SILO operation when the start mode identified by a control command in the number 4 through 7 bit positions of the SICTL CSR 14 is a mode responsive to a bit transmitted by the control command in the number 29 bit position of the CSR field. In this case, the stop mode is responsive to a software trigger represented by this bit that is transmitted by the control command.

The SICTL CSR 14 has the number 30 bit position in its field reserved for identification of a SILO mode for capturing data bus cycles. The presence or absence of a set bit in this position transmitted by a control command to the SICTL CSR 14 may be used to command the memories 10 and 12 corresponding to the SICTL CSR 14 to go off line into the SILO mode to capture data bus cycles.

The SICTL CSR 14 has the number 31 bit position in its field reserved for identification of a SILO mode arm bit. The presence of a bit in this position transmitted by a control command to the SICTL CSR 14 is used to trigger the operation of the memories 10 and 12 in the SILO mode after they are configured to capture data bus cycles.

The address in the SISTA CSR 16 indicates what memory address to start using during the SILO operation. The address in the SIENA CSR 18 indicates the last memory address used.

Figure 4:
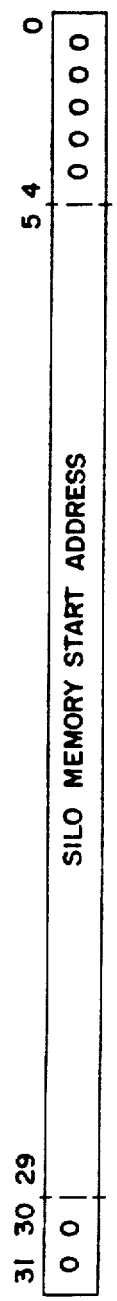
FIG. 4 is a data field for the input of a SILO start trace address control and status register according to the present invention.

A masked 32 bit SILO start trace address command is then sent on the data bus 8 to the address of the SISTA CSR 16 to indicate the physical memory start address in the master memory 10 at which the silo operation is to start storing captured data bus cycles. The 32 bit field for the SISTA CSR 16 is shown in FIG. 4. An MBZ field is contained in the number 30 and 31 bit positions of the 32 bit field for the SISTA CSR 16.

The SILO start trace address command has a 25 bit SILO memory start address that extends from the number 5 to 29 bit positions of the 32 bit field for the SISTA CSR 16, and an MBZ field that extends from the number 0 to 4 bit positions to provide a hexaword-aligned field for the SILO start trace address command.

The SILO memory start address indicates the starting address of the memory in the data processing system dedicated to the SILO operation during the SILO tracing mode.

Figure 5:
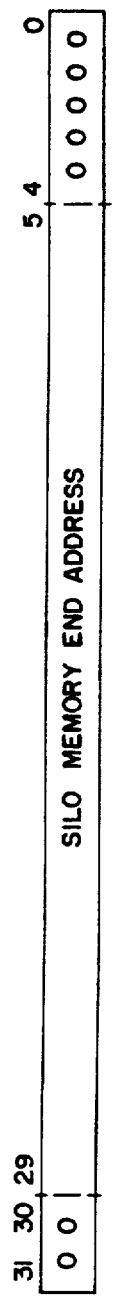
FIG. 5 is a data field for the input of a SILO end trace address control and status register according to the present invention.

The 32 bit field for the SIENA CSR 18 is shown in FIG. 5. The SIENA CSR 18 has its number 5 through 29 bit positions reserved for a 25 bit physical memory address at which the silo operation ends. The number 0 to the number 4 bit positions, as well as the number 30 and 31 bit positions, are MBZ fields.

The SILO memory end address indicates the ending address of the memory in the data processing system dedicated to the SILO operation during the SILO tracing mode. This indicates the memory address last used when the SILO operation stopped. It is used to determine how much of the memory to extract, so that the entire memory of the memory units 10 and 12 does not have to be extracted when the SILO operation has not gone all the way through the memory of the memory units 10 and 12.

The SILO operation is characterized by a trace mode for the memories 10 and 12 that captures and stores a selected number of contiguous bus cycles in their respective queues. The trace mode is initiated with a single long word write mask command to a specified I/O address in the I/O address space of the master memory 10.

The SISTA CSR 16 in the memory unit 10 holds the starting address at which the tracing mode of the SILO operation begins. The starting address is aligned with a quadword field. The bits 30 and 31 of the 32 bit starting address are MBZ fields as far as the SISTA CSR 16 is concerned.

Likewise, since all operations are done as hexaword-aligned in the SILO operation, bits 0 through 4 are also kept as MBZ fields, as will be appreciated by those skilled in the art. The proper MBZ fields in these bit locations of the SISTA CSR 16 may be maintained by ordinary software or hardware implementation, as will also be appreciated by those skilled in the art. In this way, the SILO trace initiation is started by a single long word write mask command to the SICTL CSR 14.

The SIENA CSR 18 in each of the memory units 10 and 12 hold the address of the next available hexaword-aligned memory location after the last bus cycle is completed. When reading this counter to determine the address of the last bus cycle that has been captured by the SILO operation, a full hexaword address must be subtracted from the address held by the SIENA CSR 18. The same MBZ field arrangement used for the SISTA CSR 18 is used for the input of the SIENA CSR 18, as shown in FIG. 3.

The SILO operation may then be terminated by a single long word write mask command to the SICTL CSR 14. This may be used for continuing the SILO operation from last written locations.

The SIENA CSR 18 is reset to "0" whenever the memory units 10 and 12 are reset. Otherwise, the data processing system 2 can initialize it to any other desired value. In this way, any hardware reset command will immediately stop the entire SILO operation and return the memories to their non-SILO mode.

Figure 6:
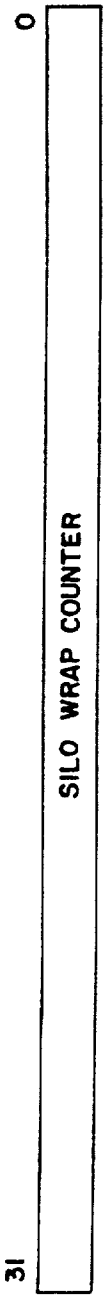
FIG. 6 is a data field for the input of a SILO wrap counter control and status register.

The SIWRA CSR 20 in the master memory unit 10 holds a full 32 bit value that represents how many times the SILO operation has wrapped beyond its maximum physical address point. The 32 bit field for the SIWRA CSR 20 is shown in FIG. 6. The SIWRA CSR 20 is reset for any hardware reset of the data processing system 2, but it must otherwise be cleared thereafter by the data processing system 2.

Although the SILO operation described above may accommodate a variety of interleaving schemes, the preferred arrangement is based upon eight cycle boundaries. This configuration permits the master memory unit 10 to capture eight contiguous bus cycles in its queue, followed by the capture of the next eight contiguous bus cycles by the slave memory unit 12 in its queue, and then the following eight contiguous bus cycles by the master memory unit 10, and so forth until the entire bus cycle sequence is captured. Alternatively, another interleaving configuration may be chosen, such as with sixteen cycle boundaries.

In the preferred embodiment, as the slave memory unit 12 captures a sequence of bus cycles, the master memory 10 copies the immediately preceding sequence of eight bus cycles that it has captured. When the master memory unit 10 captures the following sequence of eight bus cycles, the slave memory unit 12 copies the immediately preceding sequence of eight bus cycles that it has captured. Typically, the SILO operation continues until the memory units 10 and 12 are filled.

For example, if the memory units 10 and 12 each comprise a 4 MB (4,194,304 bit) DRAM, arranged with a geometry to optimize the memory units 10 and 12 for quadword write operations of 72 bits in width to accommodate one byte of ECC per eight bytes of quadword storage, each of the memories 10 and 12 have a memory capacity of 288 MB (301,989,888 bits). This allows a depth of 32M (33,554,432) bus cycles before the memory units 10 and 12 are filled. With a 64 nanosecond (ns) bus cycle rate, a real time capture of 2.15 seconds is possible.

Conveniently, programming to unload the memory units 10 and 12 uses hexaword reads to minimize unloading overhead. Furthermore, two bus cycles are returned for every hexaword read, since check bits must be returned. Thus, two hexaword reads unload four bus cycles worth of data.

Thus, there has been described herein a method and apparatus for implementing a capture of a long contiguous chain of data bus cycles for the memory system of a data processing system with memory units that alternate between real time capture of segments of the chain of data bus cycles and processing of the data bus signals in the captured segments. It will be understood that various changes in the details and arrangement of parts, systems and processes that have been described above in order to explain the nature of the present invention may be made by those skilled in the art within the principle and scope of the present invention as expressed in the appended claims.

What is claimed is:

1. A method of capturing data in real-time from a single data bus in a data processing system for later inspection and analysis, said data processing system having a plurality of memory units, each memory unit having a queue and a memory storage area, said data appearing on said data bus in sequential data bus cycles with new data being placed on said data bus during each one of said data bus cycles, said method comprising the computer-implemented steps of:

allocating two memory units of said plurality of memory units in said data processing system for real time data capture;
   receiving a command signal from said data processing system for configuring said first memory unit for real time data capture;
   receiving a command signal from said data processing system for configuring said second memory unit for real time data capture;
   capturing a first sequence of data in said queue of said first memory unit;
   capturing a second sequence of data in said queue of said second memory unit;
   storing a starting address in which said first sequence of data is to be copied into said memory storage area of said first memory unit from said queue of said first memory unit;
   storing an ending address at which the copying of said first sequence of data into said memory storage area of said first memory unit from said queue of said first memory unit is terminated;
   copying said first sequence of data from said queue of said first memory unit to said memory storage area of said first memory unit while said second sequence of data is being captured in said queue of said second memory unit;
   storing a starting address in which said second sequence of data is to be copied into said memory storage area of said second memory unit from said queue of said second memory unit;
   storing an ending address at which the copying of said second sequence of data into said memory storage area of said second memory unit from said queue of said second memory unit is terminated;
   copying said second sequence of data from said queue of said second memory unit to said memory storage area of said second memory unit;
   determining the presence of an event stop condition based upon information from said data bus for stopping the data capture process.

2. The method recited in claim 1, wherein said method further comprises the computer-implemented step of:

capturing a sequence of data in said queue of said first memory unit while said second memory unit copies the data in its queue;
   capturing a sequence of data in said queue of said second memory unit while said first memory unit copies the data in its queue; and
   continuing said steps of capturing said sequences of data alternating between said first memory unit and said second memory unit to provide a copy of a continuous string of said sequential sequences of said data alternating between said first memory unit and said second memory unit.

3. The method recited in claim 1, further comprising the computer-implemented steps of counting the number of times the physical addresses of said first and second memory units wrap over as said data is copied into said first and second memory units.

4. An apparatus for capturing data in real-time from a single data bus in a data processing system for later inspection and analysis, said data appearing on said data bus in sequential data bus cycles with new data being placed on said data bus during each one of said data bus cycles, said apparatus comprising:

a first memory unit connected to said data bus for capturing a first sequence of data appearing on said data bus during a first plurality of said bus cycles;

a second memory unit connected to said data bus for capturing a second sequence of data appearing on said data bus during a second plurality of said bus cycles occurring after said first plurality of bus cycles;

said first memory unit comprising:

a first queue for temporarily storing said first sequence of data appearing on said bus during said first plurality of bus cycles;

a first memory storage area for receiving data copied from said first queue while said second memory unit captures said second sequence of data;

a first command register for receiving a command signal from said data processing system for configuring said first memory unit to capture said data during said first plurality of bus cycles;

a first starting address register for storing a starting address in which said first sequence of data is to be copied into said first memory storage area from said first queue;

a first ending address register for storing an ending address at which the copying of said first sequence of data into said first memory storage area from said first queue is terminated; and a first control and status register for detecting an event stop condition based upon information from said data bus and for stopping said data capturing; and said second memory unit comprising:

a second queue for temporarily storing said second sequence of data appearing on said bus during said second plurality of bus cycles, said second plurality of bus cycles occurring sequentially after said first plurality of bus cycles;

a second memory storage area for receiving said second sequence of data copied from said second queue;

a second command register for receiving a command signal from said data processing system for configuring said second memory unit to capture said data during said second plurality of bus cycles;

a second starting address register for storing a starting address in which said second sequence of data is to be copied into said second memory storage area from said second queue;

a second ending address register for storing an ending address at which the copying of said second sequence of data into said second memory storage area from said second queue is terminated; and a second control and status register for detecting an event stop condition based upon information from said data bus and for stopping said data capturing.

5. The apparatus recited in claim 4, wherein said first and second memory units begin capturing alternating consecutive sequences of said data bus cycles in response to said command signal received by said command register.

6. The apparatus recited in claim 4, wherein said first and second memory units begin copying said captured data bus cycles at said starting address received by said starting address register.

7. The apparatus recited in claim 4, wherein one of said first and second memories captures a sequence of data cycles in its queue as the other one of said first and second memories copies said captured data bus cycles in its queue.

8. The apparatus as set forth in claim 4 wherein said first control and status register comprises a first physical address wrapping register for indicating the number of times a predetermined physical address in said first memory storage area is overwritten during copying of data to said first memory storage area from said first queue.

9. The apparatus as set forth in claim 4 wherein said second control and status register comprises a second physical address wrapping register for indicating the number of times a predetermined physical address in said second memory storage area is overwritten during copying of data to said second memory storage area from said second queue.

* * * * *